United States Patent
Sizemore et al.

(10) Patent No.: US 12,071,964 B2
(45) Date of Patent: Aug. 27, 2024

(54) HYDRAULIC SYSTEM WITH ELECTRONIC IDENTIFIERS

(71) Applicant: CNH Industrial America LLC, New Holland, PA (US)

(72) Inventors: Terry Bruce Sizemore, Willowbrook, IL (US); Jerry Lee Brinkley, Woodridge, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 18/461,985

(22) Filed: Sep. 6, 2023

(65) Prior Publication Data
US 2023/0407891 A1    Dec. 21, 2023

Related U.S. Application Data

(63) Continuation of application No. 17/124,857, filed on Dec. 17, 2020, now Pat. No. 11,773,881.

(51) Int. Cl.
*F15B 19/00* (2006.01)
*F16L 55/00* (2006.01)
(Continued)

(52) U.S. Cl.
CPC ............ *F15B 19/005* (2013.01); *F16L 55/00* (2013.01); *G06K 7/10297* (2013.01);
(Continued)

(58) Field of Classification Search
CPC ..... F15B 19/005; F16L 55/00; F16L 2201/10; G06K 7/10297; G06K 7/10366; G06K 19/0723
(Continued)

(56) References Cited

U.S. PATENT DOCUMENTS 8,515,687 B2   8/2013 Pereira et al.
9,051,710 B2   6/2015 Jones et al.
(Continued)

FOREIGN PATENT DOCUMENTS

WO   WO-2019/210212 A1   10/2019

OTHER PUBLICATIONS

Korane, Kenneth. "Hydraulic Hose Handles the Pressure and the Heat." Machine Design, Mar. 2, 2011, www.machinedesign.com/news/article/21829586/hydraulic-hose-handles-the-pressure-and-the-heat, 17 pages.

*Primary Examiner* — Michael G Lee
*Assistant Examiner* — David Tardif
(74) *Attorney, Agent, or Firm* — Rickard K. DeMille; Rebecca L. Henkel; Peter K. Zacharias

(57) ABSTRACT

A hose assembly for a hydraulic system, the hose assembly includes: a first hose coupled a pump with a hydraulic actuator using a first port, wherein the first hose comprises a first electronic device configured to provide identification information for the first hose, a second hose coupled with the hydraulic actuator with a hydraulic return component using a second port, wherein the second hose comprises a second electronic device configured to provide identification information for the second hose; and a controller. The controller receives connection signals and identification information for the first hose and the second hose, determines a connection fault based on at least one of the first connection signal and the second connection signal, and adjusts internal operation of a hydraulic manifold.

20 Claims, 11 Drawing Sheets

(51) Int. Cl.
    *G06K 7/10*           (2006.01)
    *G06K 19/07*         (2006.01)

(52) U.S. Cl.
    CPC ..... *G06K 7/10366* (2013.01); *G06K 19/0723* (2013.01); *F16L 2201/10* (2013.01)

(58) Field of Classification Search
    USPC .......................................................... 60/328
    See application file for complete search history.

(56) References Cited

U.S. PATENT DOCUMENTS

| | | | |
|---|---|---|---|
| 9,075,699 | B2 | 7/2015 | Wetterlund |
| 9,194,227 | B2 | 11/2015 | Snider et al. |
| 9,226,440 | B2 | 1/2016 | Bassett |
| 9,230,144 | B2 * | 1/2016 | Kawasaki .......... G06K 7/10009 |
| 10,082,447 | B2 | 9/2018 | Estevo et al. |
| 2002/0183975 | A1 * | 12/2002 | Wiens ................... G07F 13/025 |
| | | | 702/187 |
| 2007/0145129 | A1 | 6/2007 | Perkin et al. |
| 2010/0102974 | A1 * | 4/2010 | Keast .................... F15B 19/005 |
| | | | 340/626 |
| 2015/0186837 | A1 * | 7/2015 | Bianco ................. B60P 3/2245 |
| | | | 235/381 |
| 2016/0300195 | A1 | 10/2016 | Harvey et al. |
| 2017/0246778 | A1 | 8/2017 | Trowbridge |
| 2018/0231167 | A1 | 8/2018 | Wallace et al. |
| 2018/0245609 | A1 * | 8/2018 | Caldwell ............. F15B 19/005 |
| 2018/0293551 | A1 * | 10/2018 | Buca ................... G06Q 10/0833 |
| 2019/0113057 | A1 | 4/2019 | Olsson |
| 2019/0389519 | A1 | 12/2019 | Bergsten et al. |
| 2020/0060066 | A1 * | 2/2020 | Blunier ............... A01B 63/008 |

\* cited by examiner

HYDRAULIC SYSTEM WITH ELECTRONIC IDENTIFIERS

CROSS-REFERENCE TO RELATED PATENT APPLICATION

This application is a continuation of U.S. patent application Ser. No. 17/124,857, filed Dec. 17, 2020, which is incorporated herein by reference in its entirety.

BACKGROUND

The present disclosure relates generally to hydraulic systems for heavy machinery. More specifically, the present disclosure relates to monitoring hydraulic systems for heavy machinery.

SUMMARY

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

One implementation of the present disclosure is a hose assembly for a hydraulic system. The hose assembly includes a first hose configured to fluidly couple a pump with a hydraulic actuator using a first port, wherein the first hose comprises a first electronic device configured to provide identification information for the first hose, a second hose configured to fluidly couple the hydraulic actuator with a hydraulic return component using a second port, wherein the second hose comprises a second electronic device configured to provide identification information for the second hose, and a controller. The controller is configured to receive a first connection signal using the identification information for the first hose and a second connection signal using the identification information for the second hose. The controller is configured to determine that the first hose has fluidly coupled using the first port based on the first connection signal. The controller is configured to determine that the second hose has fluidly coupled using the second port based on the second connection signal. The controller is configured to determine a connection fault based on at least one of the first connection signal and the second connection signal. The controller is configured to adjust internal operation of a hydraulic manifold to fluidly couple the pump with the hydraulic actuator using the first hose and to fluidly couple the hydraulic actuator with the hydraulic return component using the second hose.

Another implementation of the present disclosure is a method of determining faults in a hydraulic system. The method includes receiving a first connection signal using the identification information for the first hose and a second connection signal using the identification information for the second hose. The method includes determining that the first hose has fluidly coupled using the first port based on the first connection signal. The method includes determining that the second hose has fluidly coupled using the second port based on the second connection signal. The method includes determining a connection fault based on at least one of the first connection signal and the second connection signal. The method includes adjusting internal operation of the hydraulic manifold to fluidly couple the pump with the hydraulic actuator using the first hose and to fluidly couple the hydraulic actuator with the hydraulic return component using the second hose.

Another implementation of the present disclosure is a hydraulic system. The hydraulic system includes a first hose configured to fluidly couple a pump with a hydraulic actuator using a first port, wherein the first hose comprises a first electronic device configured to provide identification information for the first hose, a second hose configured to fluidly couple the hydraulic actuator with a hydraulic return component using a second port, wherein the second hose comprises a second electronic device configured to provide identification information for the second hose, and a controller. The controller is configured to receive a first connection signal using the identification information for the first hose and a second connection signal using the identification information for the second hose. The controller is configured to determine that the first hose has fluidly coupled using the first port based on the first connection signal. The controller is configured to determine that the second hose has fluidly coupled using the second port based on the second connection signal. The controller is configured to determine a connection fault based on at least one of the first connection signal and the second connection signal. The controller is configured to adjust internal operation of a hydraulic manifold to fluidly couple the pump with the hydraulic actuator using the first hose and to fluidly couple the hydraulic actuator with the hydraulic return component using the second hose.

DETAILED DESCRIPTION

Overview

Figure 1:
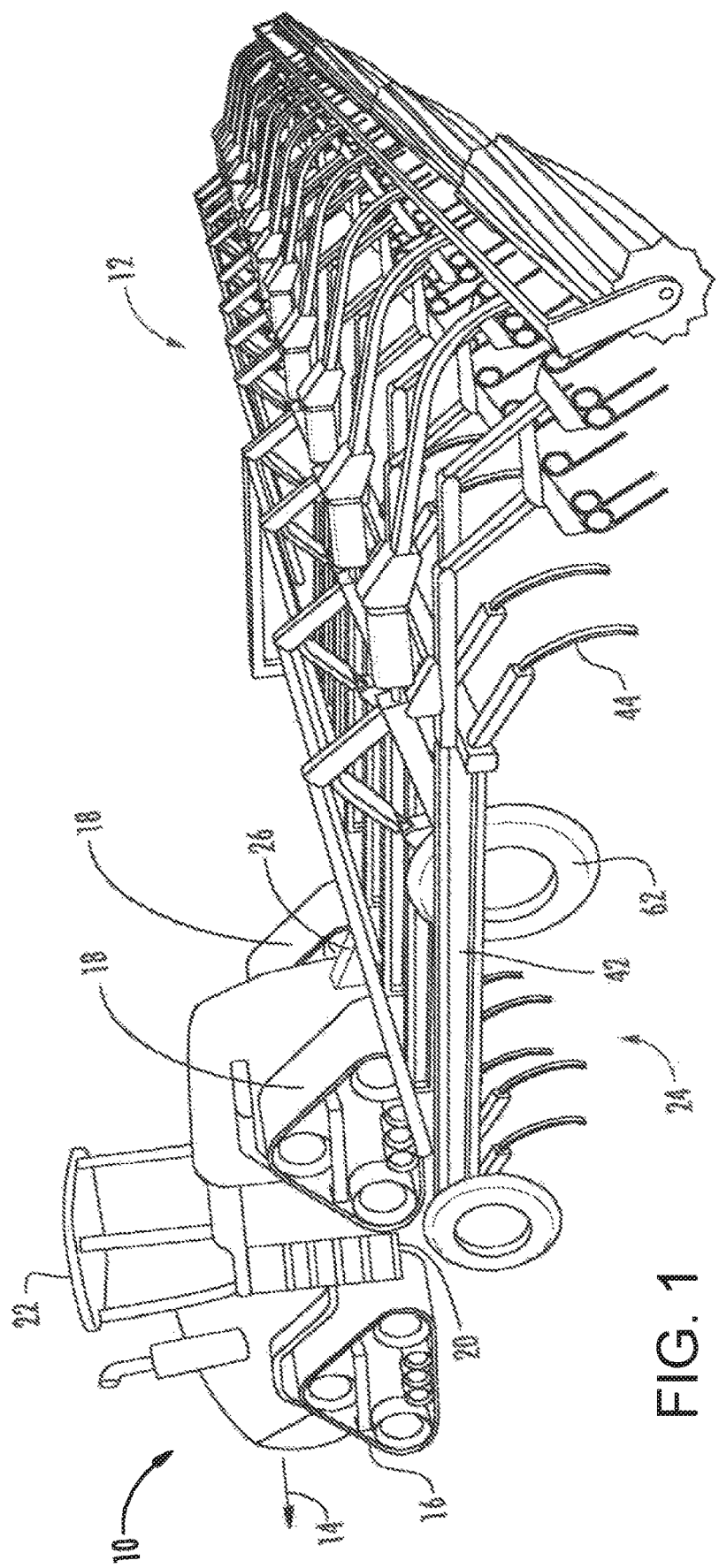
FIG. 1 is a perspective view of a vehicle, according to some embodiments.

Referring generally to the FIGURES, systems and methods for monitoring hose connections to a hydraulic manifold are shown, according to some embodiments. The monitoring may be performed using electronic identifiers pertaining to each hose: one coupled to the outlet of the one hydraulic hose and one proximate to the port in which the hydraulic hose is connecting to. The two electronic identifiers may communicate with one another to determine which hose has connected to which port. For example, the system can determine if an outlet hose from a hydraulic pump is coupled to the pump port on the hydraulic manifold (correct) or to the reservoir tank port on the hydraulic manifold (incorrect).

A controller may be implemented in the system that can analyze the hose connection data to determine if there is one or more faults associated with the connections. In the "incorrect" example above, the controller may be able to determine that the configuration is incorrect based on previously stored information relating to correct system operation. Once a fault has been detected, this information can be provided to a user for notification purposes. In some embodiments, other faults can be detected, such as hose specification faults and hose disconnect faults.

Furthermore, the controller may include functionality to automatically adjust the system to correct for the fault. While all faults may not be automatically adjustable via the controller, some may be corrected by the controller sending control signals to the system components. Staying with the "incorrect" example above, the controller may provide control signals to the hydraulic manifold that adjusts the valve positioning within the hydraulic manifold such that the pump ports and tank ports are routing fluid to the opposite locations, thus fixing the assembly fault without disconnecting and appropriately re-connecting the hoses.

While the systems and methods disclosed herein generally refer to an open hydraulic system (e.g., system 400 described below), this is merely meant for simplicity purposes. As described in detail below, the systems and methods described herein can be implemented in any number of hydraulic control systems, such as those with closed-loop circuits (e.g., system 450, etc.). Furthermore, while hose 502 is generally used to discuss hose connections within the system, this is also meant for simplicity purposes and the systems and methods described herein may be implemented with other hoses (e.g., reservoir tank hoses, port AB hoses, etc.).

As described herein, electronic devices can refer passive tags and/or active tags, RFID tag readers, or any combination thereof. Electronic devices may include devices with a power source (e.g., a battery-powered device, etc.), or no power source (e.g., passive RFID tag, etc.). Electronic devices are not limited to these descriptions and can include other types of communication devices. For example, electronic devices may include Bluetooth beacons for Bluetooth communication, Wi-Fi receivers/transceivers for Wi-Fi communication, and near-filed communication devices. Furthermore, electronic devices may communicate wiredly and not over a wireless communications network.

As described herein, the systems and methods are generally implemented within work vehicle 10. Work vehicle 10 may include any type of heavy machinery, heavy equipment, or machinery in general that uses hydraulic components during operation. For example, work vehicle 10 could include be or include a skid steer loader, an excavator, a backhoe loader, a wheel loader, a bulldozer, a telehandler, a motor grader, machines with hydraulic brakes, machines with power steering systems, machines with transmissions, garbage trucks, refuse vehicles, aircraft flight and vehicles, and/or lifts.

Figure 2A:
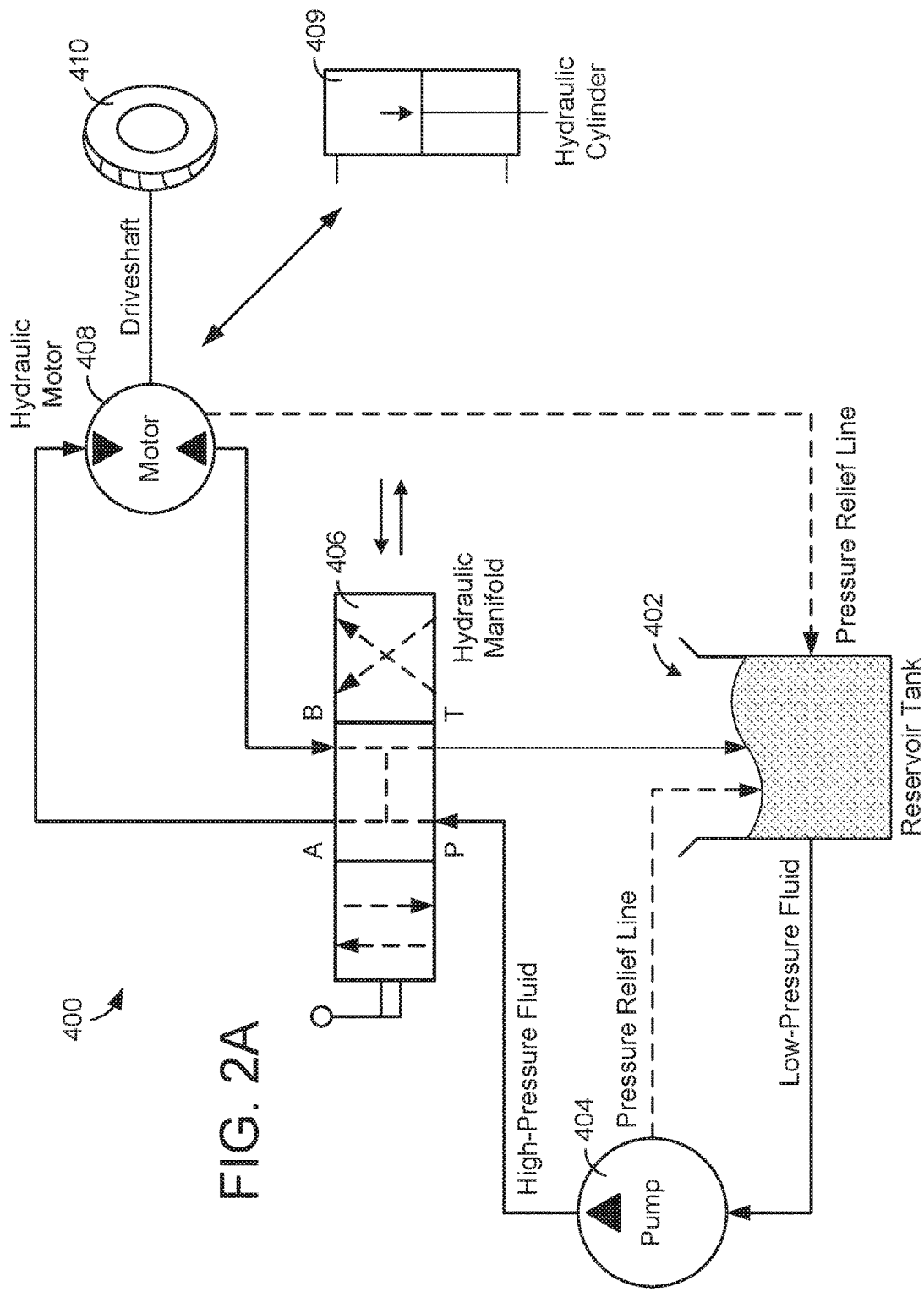
FIG. 2A is a block diagram of an open loop hydraulic system which can be implemented in the vehicle of FIG. 1, according to some embodiments.
Figure 2B:
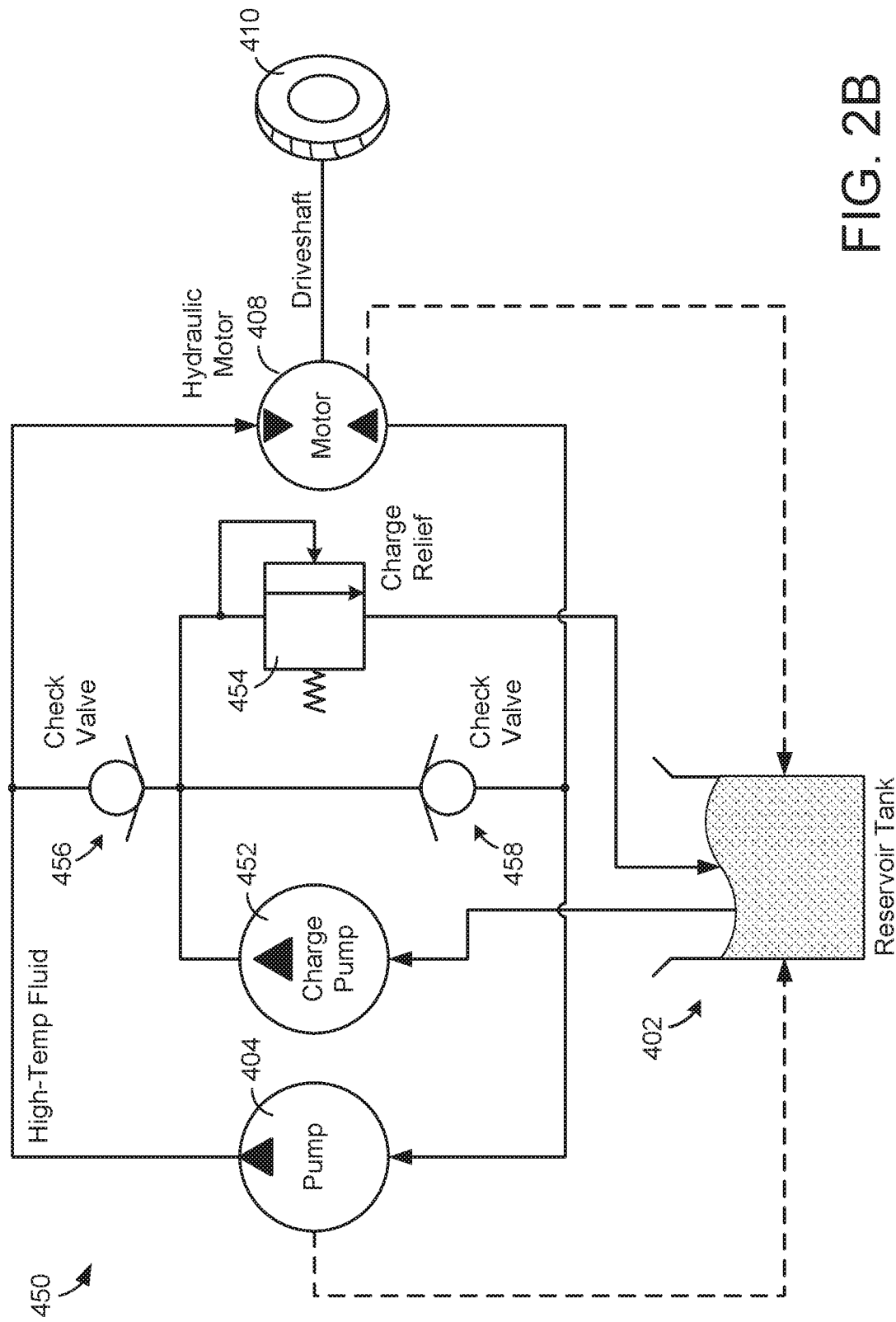
FIG. 2B is a block diagram of a closed loop hydraulic system that can be implemented in the vehicle of FIG. 1, according to some embodiments.

As described herein, a hydraulic return component can refer to any hydraulic component in which fluid is routed back to from the motor. In some embodiments, the system is configured as an open loop system that routes fluid from the motor (e.g., motor 408) back to a reservoir (e.g., reservoir tank 402), as shown in FIG. 2A, wherein the reservoir tank acts as the hydraulic return component. In other embodiments, the system can act as a closed loop hydraulic system where fluid is routed from the motor back to the hydraulic pump (e.g., pump 404), as shown in FIG. 2B. The term "hydraulic return component" may refer to hydraulic pumps, hydraulic reservoir tanks, or both.

As described herein, an actuator assembly can refer to any type of device capable of converting hydraulic fluid pressure into mechanical motion via linear force, torque, or a combination thereof. In some embodiments, an actuator assembly includes a hydraulic cylinder. In other embodiments, an actuator assembly includes a hydraulic motor (e.g., one-way hydraulic motor, two-way hydraulic motor, etc.). While the systems and methods described herein generally refer to a hydraulic motor, this should not be considered limiting and any actuator assembly may be used to receive hydraulic fluid from a pump and actuator an end component using the received hydraulic fluid.

Overall Vehicle

Referring now to FIG. 1, a diagram of work vehicle 10 and associated agricultural implement 12 in accordance with aspects of the present subject matter. Specifically, FIG. 1 illustrates a perspective view of work vehicle 10 towing implement 12 along a direction of travel (e.g., as indicated by arrow 14), with the implement 12 being unfolded into a work position. In so embodiments, hydraulic implement 12 is controlled and/or operated by one or more hydraulic systems. As shown in the illustrated embodiment, work vehicle 10 is configured as an agricultural tractor. However, in other embodiments, the work vehicle 10 may be configured as any other suitable vehicle, such as a skid steer loader, an excavator, a backhoe loader, a wheel loader, a bulldozer, a telehandler, a motor grader, and/or another type of construction machine or vehicle. Work vehicle 10 may be or include any type of vehicle or machine that uses hydraulic systems to move or operate one or more implements.

Work vehicle 10 is shown to include a pair of front track assemblies 16, a pair or rear track assemblies 18 and frame or chassis 20 coupled to and supported by the track assemblies 16, 18. Operator's cab 22 may be supported by a portion of chassis 20 and may house various input devices for permitting an operator to control the operation of one or more components of work vehicle 10 and/or one or more components of implement 12. Additionally, as is generally understood, work vehicle 10 may include an engine (not shown) and a transmission (not shown) mounted on chassis 20. The transmission may be operably coupled to the engine and may provide variably adjusted gear ratios for transferring engine power to track assemblies 16, 18 via a drive axle assembly (not shown) (or via axles if multiple drive axles are employed). Work vehicle 10 may also include operator input and output devices, such as an operator interface (e.g., operator interface 632 described below).

It should be appreciated that the configuration of work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer work vehicle 10, or rely on tires/wheels in lieu of the track assemblies 16, 18. Additionally, although work vehicle 10 is shown in FIG. 1 as including cab 22 for an operator, the work vehicle 10 may, instead, correspond to an autonomous vehicle, such as an autonomous tractor.

According to an exemplary embodiment, work vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the work vehicle 10 includes one or more attached implements and/or trailed implements such as a front mounted mower, a rear mounted mower, a trailed mower, a tedder, a rake, a baler, a plough, a cultivator, a rotavator, a tiller, and/or another type of attached implement or trailed implement.

Vehicle Hydraulic System

Referring now to FIG. 2A, a block diagram of hydraulic system 400 which can be implemented in the vehicle of FIG. 1, according to some embodiments. System 400 may be configured as an open loop hydraulic system, wherein the fluid flow is continuous and the system pressure may be intermittent. System 400 is shown to include reservoir tank 402, hydraulic pump ("pump") 404, hydraulic manifold ("manifold") 406, hydraulic motor ("motor") 408 and tractive element 410. System 400 may act as a hydraulic system for work vehicle 10 to move one or more end components of work vehicle 10. For example, system 400 is configured to provide hydraulic fluid to motor 408, creating torque on a driveshaft coupled to tractive element 410, thus rotating tractive element 410. In another example, system 400 is configured to provide hydraulic fluid to a hydraulic cylinder for an excavator arm of work vehicle 10, displacing the position of the cylinder and moving the excavator arm coupled to the cylinder.

System 400 may be configured as an open-loop hydraulic circuit. In some embodiments, system 400 provides a continuous flow of hydraulic fluid to motor 408. Upon leaving motor 408, the fluid is returned to reservoir tank 402, which may be done without pumping the return hydraulic fluid to a high pressure. The configuration of system 400 as an open-loop circuit may differ from other types of hydraulic systems (e.g., closed-loop hydraulic circuits, etc.), which is described in greater detail below with reference to FIG. 2B.

System 400 is not limited the components described above and may include other components typically found in hydraulic systems, such as control valves (e.g., pressure relief valves, pressure regulators, shuttle valves, check valves, globe valves, etc.), accumulators, filters, tubes, pipes, hydraulic seals (e.g., elastomeric seals, face seals, beam seals, swaged seals, etc.), fittings (e.g., pipe fittings, flare fittings, etc.). Particularly, system 400 may include any number of hydraulic hoses for transporting fluid throughout system 400. Types of hydraulic hoses and their functionality that may be implemented in system 400 are described below with reference to FIG. 3.

System 400 may generally refer to hydraulic systems and methods within work vehicle 10. While work vehicle 10 is described above to be an off-road machine or vehicle, work vehicle 10 may also be any type of equipment that implements hydraulic systems in their functionality, such as tractors, excavators, backhoes, hydraulic brakes, power steering systems, transmissions, garbage trucks, refuse vehicles, aircraft flight vehicles, lifts, and industrial machinery.

Reservoir tank 402 may be configured to hold excess hydraulic fluid to accommodate volume changes within system 400. These volume changes may include but are not limited to cylinder extension, cylinder contraction, temperature driven expansion, temperature driven expansion, and/or leaks. As described herein, "fluid" or hydraulic fluid may refer to any type of fluid capable of being pressurized and supplied to an actuation device (e.g., motor, ram, etc.) to actuate another component. In some embodiments, hydraulic fluid refers to any medium by which power is transferred in system 400. Reservoir tank 402 may be configured to aid in separation of air from the hydraulic fluid, work as a heat accumulator to cover losses in system 400 when peak power is used, and separate dirt and other particulate from the oil. Reservoir tank 402 is shown to receive fluid from pressure relief lines and fluid lines from manifold 406 and provide low-pressure fluid to pump 404.

While reservoir tank 402 is shown as a separate tank for which hydraulic fluid can be stored, reservoir tank 402 may also be a storage component directly within pump 404. For example, instead of the fluid routing back from motor 408 to reservoir tank 402, the fluid is routed directly back to pump 404, and any additional fluid within pump 404 is considered fluid storage within reservoir tank. In such embodiments, the flow rate may be considered intermittent as there is less hydraulic fluid to extract from tank 402, but system pressure may remain generally constant.

For example, once fluid exits motor 408 after providing mechanical torque to the driveshaft of motor 408, the return fluid is routed through manifold 406 back to reservoir tank 402. If the pressure within motor 408 was too high, a pressure relief line from motor 408 may route excess fluid back to reservoir tank 402—reducing the internal pressure—to avoid damage to system 400. In some embodiments, pump 404 may also experience unsafe pressure levels and result in the pump pressure relief line routing hydraulic fluid back to reservoir tank 402 to avoid damage to system 400.

Pump 404 may be configured to supply fluid to the components in system 400. In some embodiments, pump 404 may be configured to provide pressure in the system in reaction to the system load. For example, if pump 404 is rated for 5,000 pounds per square inch (psi), pump 404 is capable of maintaining flow against a load of 5,000 psi. Pump 404 may be configured as an axial piston pump in system 400 to vary output flow for automatic control of pressure. This may allow system 400 maintain a constant pressure by varying the flow rate of the hydraulic fluid throughout system 400. Other pumps may also be considered, such as gear pumps, vane pumps, and radial piston pumps. Pump 404 is shown to receive low pressure fluid and provide high pressure fluid to manifold 406. Pump 404 is also shown to include a pressure relief line back to reservoir tank 402. In some embodiments, the pressure relief line from pump 404 is used to reduce pressure by routing fluid back to reservoir tank 402 if the system pressure reaches a predetermined threshold.

Manifold 406 may be configured to regulate fluid flow within system 400. In some embodiments, manifold 406 may act analogously to an electrical switchboard, as the operator can control how much fluid flows between which components of system 400. While system 400 only shows a single hydraulic line entering manifold 406, multiple input and output lines can be considered, as can be typical in implementations of hydraulic manifolds. Manifold 406 may include one or more assorted valves, the configuration of which being responsible for routing fluid through the manifold 406. In some embodiments, manifold 406 includes a control mechanism (e.g., lever, button, slide, etc.) that allows for adjustment to the routing of fluid within manifold 406. Manifold 406 may include one or more hydraulic ports, described in greater detail below with reference to FIG. 3. Manifold 406 is shown to allow fluid from pump 404 to provide port A fluid to motor 408. Manifold 406 is also shown to receive port B fluid from 408, and facilitate transportation of the port B fluid back to pump 404 (e.g., via reservoir tank 402, etc.). In some embodiments, manifold 406 includes one or more solenoid valves to route fluid.

Manifold 406 may include one or more control valves that allows manifold 406 to operate in one or more positions. In some embodiments, this assembly of valves within a single housing may be referred to as the center control valve for the hydraulic system (e.g., system 400, system 450, etc.). As an example, manifold 406 as shown in FIG. 2A contains three separate positions, indicated by the three separate boxes within the component. As shown in FIG. 2A, manifold 406 is currently in the "open center" position, which connects all four ports together, allowing the motor receive fluid in both directions (e.g., via port A and port B). Manifold 406 also includes a lever that can adjust which configuration is currently engaged. For example, if a user pulls the lever, manifold 406 may transition from "open center" position to the "reversed" position (e.g., the far right position). Manifold 608 and the various valve configurations therein are not limited to being controlled by a lever and can also be controlled manually, via a solenoid, a push button, a pedal, compressed air, a fluid pilot, or a cam.

In some embodiments, manifold 406 can change the valve position based on a signal sent from a controller. This may be advantageous if a control system monitoring system 400 determines that there is an error (e.g., error signal, incorrect installation, etc.) that can be solved by placing the center control valve (e.g., manifold 406) in a different position. This is described in greater detail below with reference to FIG. 8.

Motor 408 may be configured to convert the hydraulic pressure provided by pump 404 to torque, force, rotational displacement, linear displacement, or any combination thereof. While motor 408 is described as a "motor" (e.g., a rotary device), a hydraulic cylinder in place of motor 408 may also be considered. This is shown by hydraulic cylinder 409. Similar to motor 408, hydraulic cylinder 409 may be configured as a double-acting cylinder to operate in bother directions. In one example, motor 408 is configured to receive hydraulic fluid from pump 404 and rotate a driveshaft coupled to tractive element 410. In another example, hydraulic cylinder 409 receives hydraulic fluid from pump 404 via port A and displaces the cylinder to move an excavator arm work vehicle 10.

In some embodiments, motor 408 is configured to convert the fluid pressure to mechanical force/torque in both directions (e.g., a two-way motor, etc.). For example, manifold 406 may be controlled to adjust from the configuration shown in FIG. 2A to a configuration that switches the port A fluid line and port B fluid line. This may be done by sliding manifold 406 into the far right configuration (e.g., via the lever, etc.). Subsequently, high-pressure fluid from pump 404 would be provided to the other side of motor 408 (e.g., port B) while the fluid would exit motor 408 from the top line (e.g., port A).

Referring now to FIG. 2B, a block diagram of a closed loop hydraulic system 450 is shown, according to some embodiments. In some embodiments, system 450 may incorporate some or all of the features, descriptions, and components shown in FIG. 2A. For example, system 450 may also include manifold 406. In another example, system 450 may include control valves (e.g., pressure relief valves, pressure regulators, shuttle valves, check valves, globe valves, etc.), accumulators, filters, tubes, pipes, hydraulic seals (e.g., elastomeric seals, face seals, beam seals, swaged seals, etc.), fittings (e.g., pipe fittings, flare fittings, etc.).

In some embodiments, system 450 is configured as a closed-loop hydraulic circuit, where pump 404 supplies a continuous (e.g., or near continuous) flow with varying pressure. Pump 404 may vary the provided flow rate, pumping little to no hydraulic fluid to the one or more control valves until a signal (or user operation) actuates one of the control valves, thereby reducing an open-center return path (e.g., via manifold 406 as shown in FIG. 2A) back to reservoir tank 402. System 450 is shown to include reservoir tank 402, pump 404, charge pump 452, check valves 456, 458, charge relief valve 454, motor 408, and tractive element 410. System 450 may act as another embodiment for which the systems and methods for monitoring hose connections may be implemented.

In a general embodiment, pump 404 provides continuous flow to motor 408. To avoid overly high temperature of the fluid, charge pump 452 may be configured to pump lower-temperature fluid into the high pressure (top) line of system 450, thereby reducing the temperature of the fluid. Charge pump 452 may also be configured to receive the lower-temperature fluid from tank 402. Several check valves 456, 458 may be used that allow the fluid to flow from the inner loop to the outer loop (and vice versa). Charge relief valve 454 may be configured to provide pressure relief in the system via a spring/pilot configuration. If the pilot line reaches a high enough pressure to compress the spring, fluid can be routed to tank 402 for relief.

Hydraulic System Hose Identifiers

Figure 3:
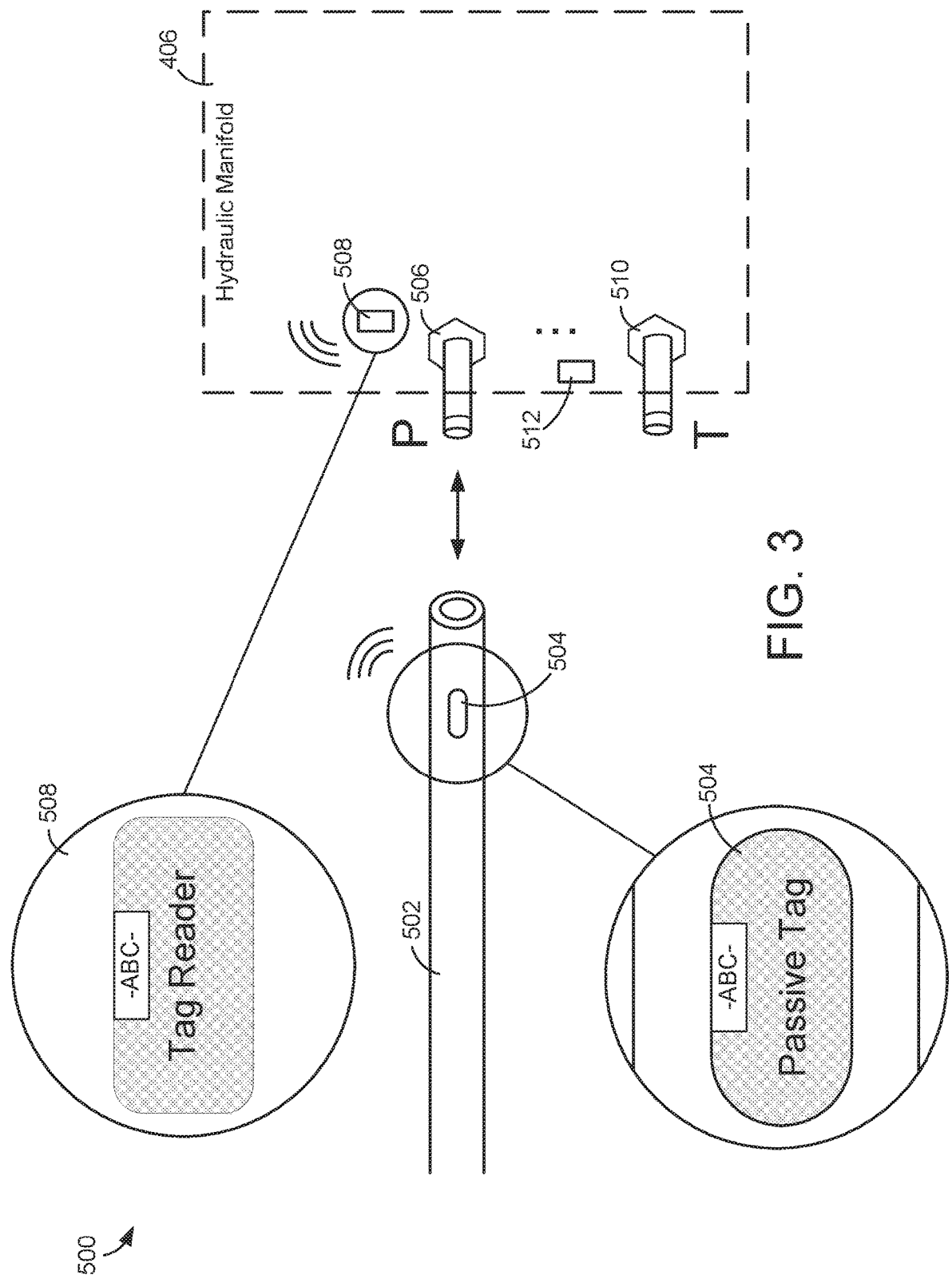
FIG. 3 is a diagram of an electronic device for detecting hydraulic hose connections which can be implemented in the hydraulic systems of FIGS. 4A-B, according to some embodiments.

Referring now to FIG. 3, a diagram 500 for detecting hydraulic hose connections via electronic devices is shown, according to some embodiments. Diagram 500 is shown to include hydraulic hose ("hose") 502, passive tag 504, hydraulic manifold 406, hydraulic connectors 506, 510, and tag readers 508, 512. In some embodiments, diagram 500 shows tag reader 508 reading passive tag 504 upon connection of hose 502 with hydraulic connector 506. Tag reader may then process and/or provide the received data to one or more processing devices (e.g., system controllers, mobile devices, workstations, etc.). These and other embodiments are described in greater detail below.

Hydraulic hose 502 may be any type of hydraulic hose, hydraulic pipe, or hydraulic tube configured to couple one or more hydraulic system components (e.g., pump 404, motor 408, etc.) with other hydraulic components, such as the hydraulic ports on hydraulic manifold 406. Systems 400, 450 may include any number of hoses similar to hose 502 for routing hydraulic fluid throughout the systems. In some embodiments, hose 502 includes both rubber and steel layers to provide enough durability to withstand the system pressures, but enough flexibility for simple installation and maintenance. In some embodiments, a rubber interior of hose 502 is surrounded by multiple layers of woven wire and rubber.

Hydraulic hose 502 may include passive tag 504 proximate to the end of hose 502 that will couple to hydraulic connector 506. In some embodiments, passive tag 504 is located on the outside of hose 502. For example, passive tag 504 is a passive radio-frequency identification (RFID) tag that is taped, glued, soldered, magnetically coupled, or mounted to the outside of hose 502. In some embodiments, passive tag 504 is located on the inside of hose 502. For example, passive tag 504 may be a fluid-proof (e.g., not damaged by hydraulic fluid) passive RFID tag mounted inside of hydraulic hose 502. In such embodiments, tag readers 508, 512 may be strong enough to transmit signals that pass through the lining of hose 502 to reach passive tag 504 and receive the return signals from passive tag 504. In some embodiments, passive tag 504 includes data on which component is being coupled to connector 506. For example, a metal terminal near pump 404 electrically connects with a metal terminal on hose 502 (not shown). The metal terminal is connected to passive tag 504 that indicates what hose 504 has connected to. This information may be relayed to tag reader 508 upon RFID transmission.

Tag reader 508 may be configured to transmit a read signal that, when hose 502 is coupled to hydraulic connector 506, can be received by passive tag 504. For example, tag reader 508 is wired directly to a power source and continuously transmits an RFID read signal. Hose 502 is coupled to hydraulic connector 506. Passive tag 504 receives the RFID read signal and provides a response signal back to tag reader 508. Tag reader 508 then provides the response signal to a processing device. In another example. tag reader 508 is battery operated and provides and RFID read signal when instructed. Hose 502 is coupled to hydraulic connector 506. An operator of a control system monitoring system 400 provides instructions to run a diagnostics report of the connected hoses to manifold 406. Tag reader 508 subsequently sends the RFID read signal, which is received by passive tag 504. Passive tag 504 provides a response signal to tag reader 508 in response and tag reader 508 sends the response signal to a processing device. The processing device determines whether there is an issue with the connection and relays that information to the user. Other examples are described in greater detail below (see FIG. 8). While tag readers 508, 510 are shown to be discrete components, a single tag reader may be used to monitor all hose connections on manifold 406.

Hydraulic connector 506 may fluidly connect to the outlet of hose 502. This may be performed using one or more coupling features, such as a notched lock, mechanical latches, magnetic latches, or fasteners. Hydraulic connector is shown to connect hose 502 to port P, as described above with reference to FIG. 2A) indicating that hose 502 is coupling from pump 404 to manifold 406 via hydraulic connector 506 at port P. As mentioned, the systems and methods described herein for monitoring and correcting hose connections can apply to any hose and/or any port configuration described herein. For example, another passive tag is located on the hose coupling reservoir tank 402 to hydraulic connector 510 (not shown).

In some embodiments, the connection between hose 502 and hydraulic connector 506 is not monitored via passive tag 504 and tag reader 508. In other embodiments, the connection may be monitored mechanically. For example, each of the hoses connecting to hydraulic manifold 406 may use a particular coupling mechanism that can only connect to its correct port. In this example, hose 502 would only be able to couple to hydraulic connector 506. This would prevent hose 502 from coupling to the wrong port (e.g., port 510, etc.). However, this may require a lack of universality between most hydraulic hoses in the industry, which is atypical.

While RFID communication is used as the means for detecting hose connection information (e.g., the methods performed in system 500, etc.), this is merely meant to be exemplary and should not in any way be considered limiting. Any electrical circuitry that is capable of providing information related to the connection of hose 502 to connector 506 should be considered. For example, hose 502 could include a metal terminal that electrically connects to another metal terminal upon coupling with connector 506. In another example, a user may directly connect (e.g., via an wire harness, etc.) circuitry from hose 502 to circuitry on manifold 406 after coupling hose 502 to connector 506. In another example, hose 502 includes near-filed communication (NFC) technology that provides hose identification information and/or hose connection information to another NFC component on manifold 406. Other means of communicating data between hose 502 and tag reader 506 may be used, such as Bluetooth, Wi-Fi, Zigbee, Zwave, XBee, near-field magnetic induction (FMI), or any other communication means typically used under NFC, body area networks (BAN), personal area networks (PAN), near-me area networks (NAN), and local area networks (LAN).

Hydraulic Control System

Referring now to FIG. 6, a control system 600 for monitoring the assembly and/or operation of hydraulic system 400 and/or system 450 is shown, according to some embodiments. Control system 600 may be implemented entirely within work vehicle 10 (e.g., via one or more printed circuit boards within an electrical housing, within the cab, etc.) or partially within work vehicle 10 (e.g., the controller is located in an off-premise server and is accessed via a mobile device or laptop, etc.). Control system 600 may be configured to receive data from electrical identifiers (e.g., passive tag 504, tag reader 508, etc.) and provide control signals, fault notifications, and other signals in response to processing the received data. Control system 600 is shown to include controller 602, hydraulic manifold 406, user device 630, and operator interface 508.

Hydraulic manifold 406 is shown to include several circuits, (including port P circuit 120) up to "n" number of circuits, indicated by port n circuit 628. These circuits may include the functionality of tag readers 508, 510 as described above with reference to FIG. 3. Port P circuit 620 is shown to include tag reader manager 622, analyzer 624, and transmission circuit 626. In some embodiments, all of the functionality performed by port P circuit via these components may be performed by more or less components.

Tag reader manager 622 may be configured to receive port P tag data and provide ID/specification information to analyzer 624. In some embodiments, port P circuit 620 is responsible for receiving data from passive tag 504. Hydraulic manifold 406 may include any number of circuits for monitoring the multiple connections (e.g., one circuit per port connection, etc.). In some embodiments, the port P tag data includes a particular hose ID signal that indicates the type of hose that hose 502 is. This hose ID signal may also include specification data about the hose, such as maximum pressure threshold, diameter, length, etc. In some embodiments, the port P tag data also includes connection information that indicates to tag reader manager 622 what port hose 502 is supposed to connect to. For example, upon receiving a return RFID signal from passive tag 504, tag reader manager 622 receives data that indicates hose 502 is the hose that has been coupled to connector 506, that hose 502 is a reinforced rubber hydraulic hose at ⅜ in.×48 in·L, rated for 4,000 PSI, and made by Apache, Co. Tag reader manager 622 can provide this information to analyzer 624.

Analyzer 624 may receive the ID/specification information and separate the data into connection data and fault signals. In some embodiments, the fault signals may be provided if there is a clear error with the signal. For example, hose 502 has been connected but no signal has been received by passive tag 504. Other faults—such as faults determined by analyzing the port P tag data—may be determined by controller 602 after transmission. Analyzer 624 may provide the connection data and/or fault data to transmission circuit 626 for transmitting to controller 602.

Controller 202 is shown to include communications interface 618 and processing circuit 604 including processor 606 and memory 608. Processing circuit 604 can be communicably connected to communications interface 618 such that processing circuit 604 and the various components thereof can send and receive data via communications interface 618. Processor 606 can be implemented as a general purpose processor, an application specific integrated circuit (ASIC), one or more field programmable gate arrays (FPGAs), a group of processing components, or other suitable electronic processing components.

Communications interface 618 can be or include wired or wireless communications interfaces (e.g., jacks, antennas, transmitters, receivers, transceivers, wire terminals, etc.) for conducting data communications with building subsystems 428 or other external systems or devices. In various embodiments, communications via communications interface 618 can be direct (e.g., local wired or wireless communications) or via a communications network (e.g., a WAN, the Internet, a cellular network, etc.). For example, communications interface can include an Ethernet card and port for sending and receiving data via an Ethernet-based communications link or network. In another example, communications interface 618 can include a Wi-Fi transceiver for communicating via a wireless communications network. In another example, communications interface 618 can include cellular or mobile phone communications transceivers.

Memory 608 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present disclosure. Memory 608 can be or include volatile memory or non-volatile memory. Memory 208 can include database components, object code components, script components, or any other type of information structure for supporting the various activities and information structures described in the present disclosure. According to an example embodiment, memory 608 is communicably connected to processor 606 via processing circuit 604 and includes computer code for executing (e.g., by processing circuit 604 and/or processor 606) one or more processes described herein.

In some embodiments, controller 602 is implemented within a single computer (e.g., one server, one housing, etc.). In various other embodiments controller 602 can be distributed across multiple servers or computers (e.g., that can exist in distributed locations). Memory 208 is shown to include data collector 610, fault manager 612, alert manager 614, and hydraulic manifold adjustment manager 616.

Data collector 610 may be configured to receive the connection data and/or fault data from the circuit(s) coupled to hydraulic manifold 406 and provide the data to fault manager 612. Fault manager 612 may be configured to analyze the data to determine if one or more actions (e.g., notifications, corrective actions, etc.) needs to be taken. For example, fault manager 612 processes the received data and determines that hose 502 was coupled to hydraulic manifold 406 via hydraulic connector 510. In this example, this is problematic, as hose 502 is therefore connecting pump 504 to the outlet of a one-way motor via port T (connector 510). Fault manager 612 determines this and provides a signal to alert manager 614 to notify a user. Other examples are considered and described in greater detail below.

Alert manager 612 may be configured to manage the multiple alerts that may be generated based on the received hose connection data. In one example, alert manager 614 may provide a notification to user device 630 via operator interface 508 that alerts the user that there is a fault. For example, following an incorrect hose connection on work vehicle 10, a user checks the vehicle tablet (e.g., user device 630) and sees a notification that states: "STOP: PUMP HOSE MISCONNECTED." In some embodiments, the fault can be fixed manually by the user or automatically by controller 602. If the controller 602 corrects the fault automatically, hydraulic manifold adjustment manger 616 may provide control signals to hydraulic manifold 406 to adjust internal operation of the manifold such that the port configuration places the system in the correct orientation without disconnecting the hoses and reconnecting them the correct way.

Figure 4A:
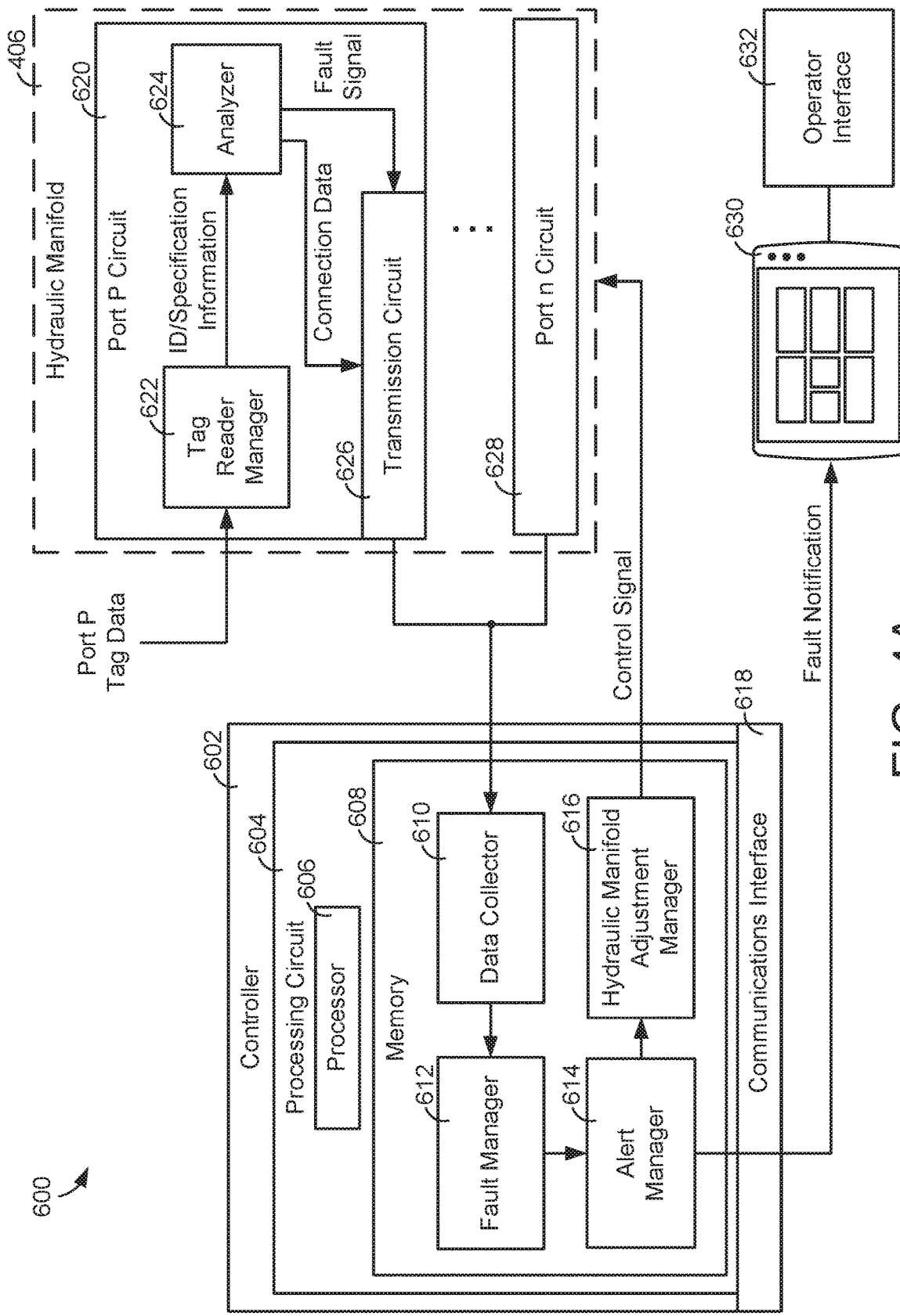
FIG. 4A is a block diagram of a control system for detecting hydraulic hose information which can be implemented in the hydraulic systems of FIGS. 4A-B, according to some embodiments.
Figure 4B:
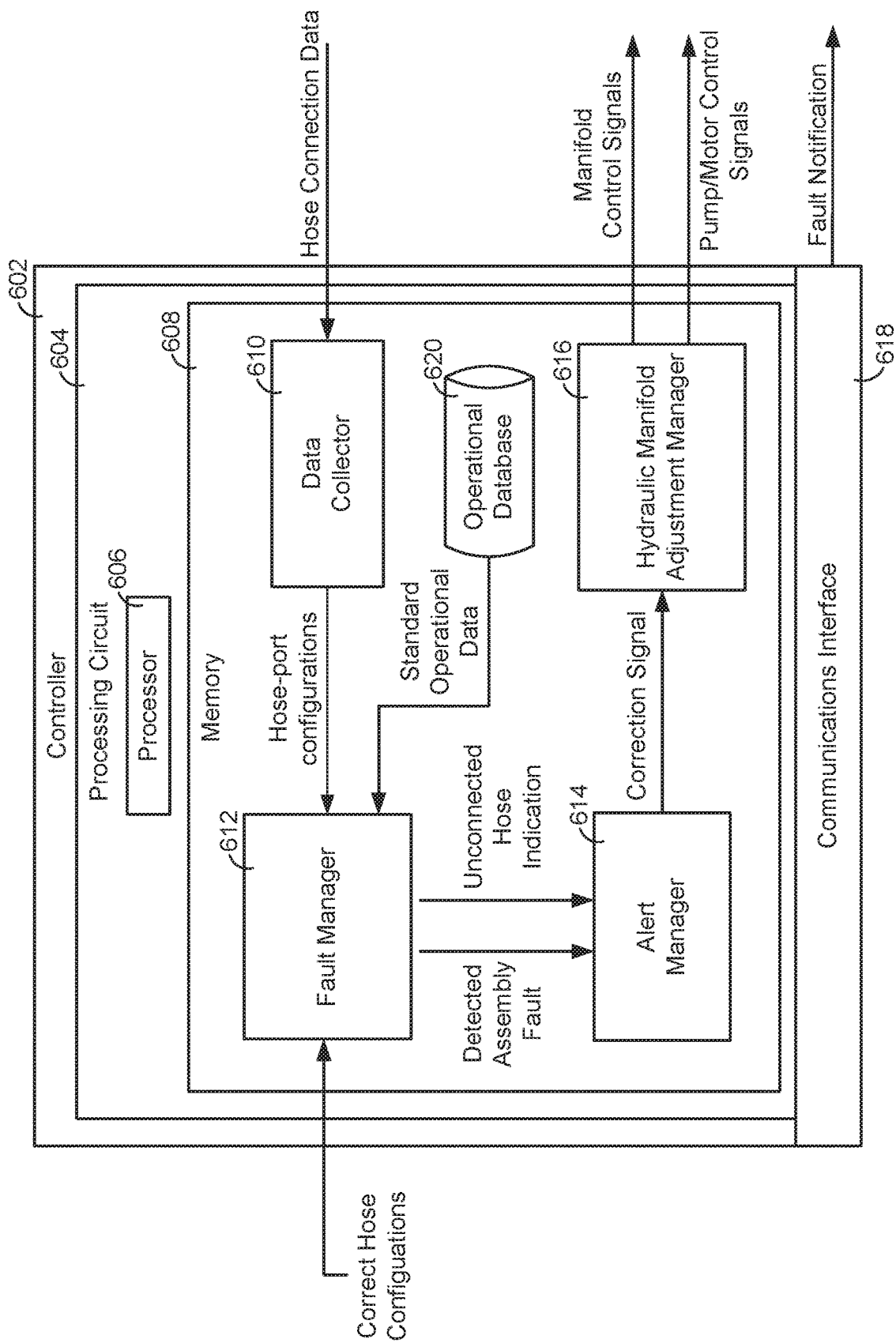
FIG. 4B is a block diagram of a controller for detecting hydraulic hose information, which can be implemented in the control system of FIG. 4A, according to some embodiments.

Referring now to FIG. 4B, a block diagram of controller 602 is shown, according to some embodiments. Controller 602 is shown to include processing circuit 604 including processor 606 and memory 608. Memory 608 is shown to include data collector 610, fault manager 612, alert manager 614, and hydraulic manifold adjustment manager 616. In some embodiments, FIG. 4B provides a more detailed illustration of controller 602 as described above with reference to FIG. 4A.

Data collector 610 may receive hose connection data and provide the data to fault manager 612. In some embodiments, data collector 610 can determine the hose/port configurations that have been provided. For example, data collector 610 can determine that hose 502 has been connected to connector 510 (fluidly coupling port T) and provide that information to fault manager 612 for analytics.

Fault manager 612 may be configured to analyze the hose connection data and determine whether a signal needs to be provided to alert manager 614 in the event of a fault. In some embodiments, fault manager 612 determines that there is no fault in system 600 and still provides a notification to a user (e.g., via operator interface 508, etc.) indicating that the assembly of the hydraulic system 400 or 450 has been assembled correctly. Fault manager 612 may receive data on the correct hose configurations, such as which types of hoses are supposed to be connected to which ports, which hoses should not be connected to which ports, etc. This data may be stored locally (e.g., in database 620, etc.) on controller 602 or received from an external device (e.g., via a server on a cloud, etc.). Fault manager 612 may compare the correct hose configurations with the hose configurations received via the hose connection data and determine if a fault has occurred.

For example, fault manager 612 receives data that indicates hose 502 has coupled pump 404 to connector 510. Fault manager compares this to the data on correct hose confirmations, which indicates that pump 502 is supposed to be connected to connector 508 (port P), to rout fluid to motor 408. Instead, hose 502 has been connected to port T, which is supposed to route fluid to reservoir tank 402. As such, routing the fluid from pump 404 through port P to reservoir tank 402 via port T, is the incorrect configuration. Fault manager 612 subsequently provide a "detected assembly fault" signal to alert manager 614. Alert manager 612 may receive this fault signal and determine that this fault can be fixed automatically. Alert manager 612 proceeds by sending a fault notification to operator interface 632 and by sending a correction signal to hydraulic manifold adjustment manager 616 to perform a corrective action. Hydraulic manifold adjustment manager 616 determines that the fault may be corrected by providing a control signal to hydraulic manifold 406 that switches the "position" of the valve configuration from "open center" position to "reversed" position. Hydraulic manifold adjustment manager 616 provides a control signal to an actuator configured to control the valve positions for hydraulic manifold 406 to switch the port configurations and correct the fault. In some embodiments (not shown), controller 602 may receive a signal that the automatic corrective action has been completed. Upon receiving this signal, alert manager 614 may provide another signal to operator interface 632, indicating that the automatic fault correction has been completed.

In some embodiments, fault manager 612 may receive standard operational data from operational database 620. This data may indicate the specifications of the identified hose, such as pressure ratings, correct configurations, length (2 m., 5 m., etc.), diameter, types of fluids that it can receive (e.g., brake fluid, power steering fluid, mineral oil-based fluid, water-based fluid, etc.), and intended use (e.g., tractor system, excavator system, etc.). Fault manager 612 may also compare the standard operational data with the received hose data. For example, fault manager 612 receives hose data relating to hose 502 connecting to connector 508. Fault manager 612 determines that this is the correct hose for coupling pump 504, but determines that the hose is out of specification due to the hose not being strong enough to handle the pressure within system 400. Fault manager 612 then provides a detected assembly fault to alert manager 614. Alert manager 614 determines that this fault cannot be fixed automatically and proceeds with sending (i) a notification signal to operator interface 632 to alert the user of the detected fault and (ii) a message to operator interface 632 detailing the fault and steps on how to correct it. In this example, the message may include details on the proper hose(s) that should be connected to port 508.

In some embodiments, fault manager 612 determines that a hose has been disconnected in real-time. For example, tag reader 508 may continuously be transmitting hose data to controller 602 to verify that hose 502 is still coupled to port 508. During operation of work vehicle 10, hose 502 disconnects from port 508. Port P circuit 620 provides this information to controller 602. Fault manager 612 then determines an unconnected hose fault and provides alert manager 614 with a signal to alert the user of work vehicle 10 (e.g., via operator interface 632). As this fault may not be corrected automatically, hydraulic manifold adjustment manager 616 does not provide any control signals for corrective action. In some embodiments, manager 616 may provide signals to pump 404 and/or motor 408 to stop operation of system 400 for safety purposes (e.g., following detection of a fault, etc.).

In some embodiments, data relating to the hose connections can be provided by the user of work vehicle 10 via operator interface 632. For example, an application on operator interface 632 an be used to send data to controller 602. A user may provide hose specifications regarding the hoses that were connected. Fault manager 612 can then receive this data and compare it to the standard operational data to determine if the attached hoses will be in compliance and/or safe for operation. Other data may also be supplied by a user of operator interface 632 via the application, such as hose/port configurations, operating limitations (e.g., maximum system pressure, maximum pump speed, maximum flow rate, etc.), and customization of the corrective actions (e.g., always adjusting the manifold, deciding to switch motor operation rather than adjusting manifold position, etc.).

Figure 5:
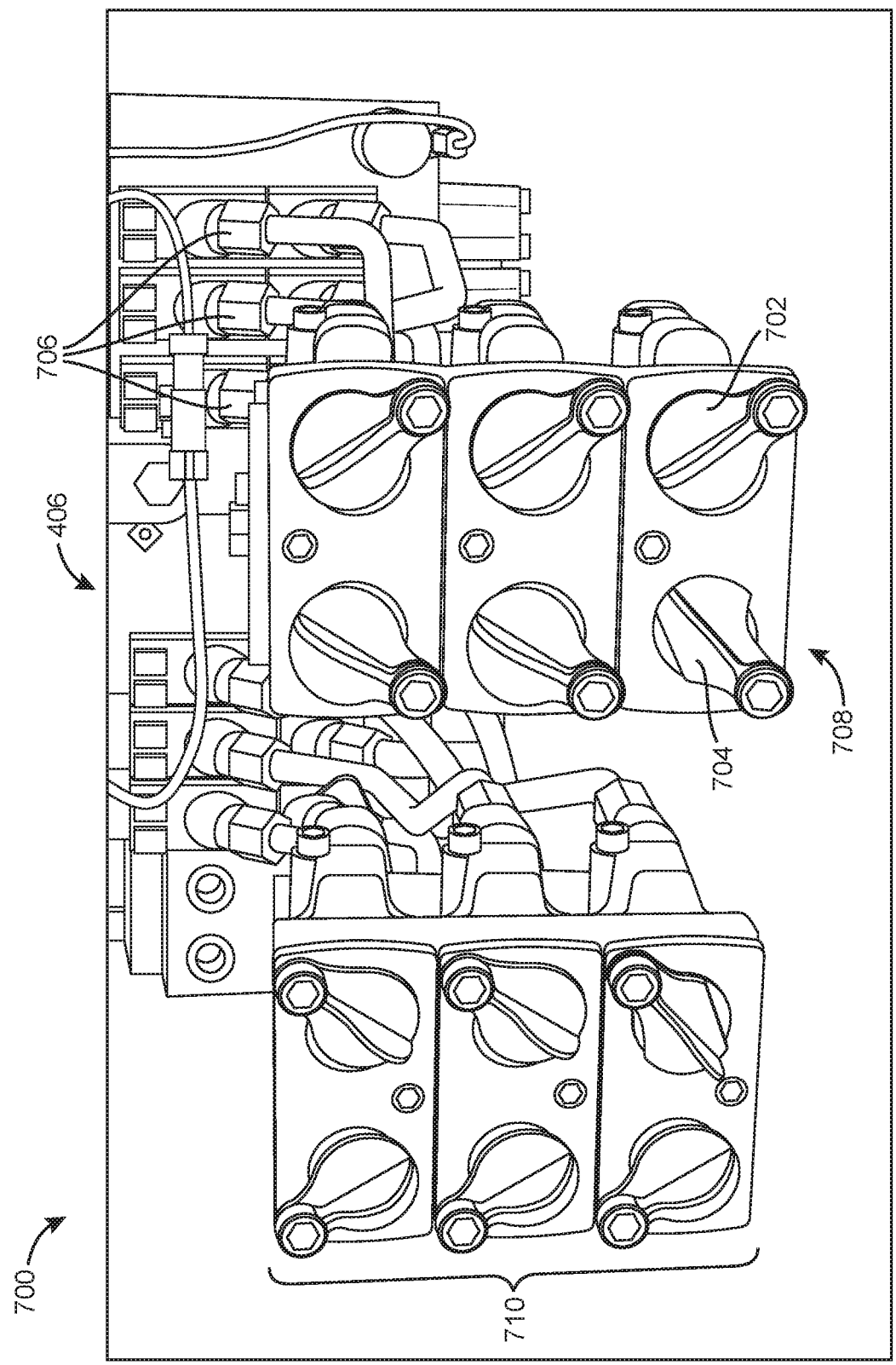
FIG. 5 is a diagram of a hydraulic manifold which can be implemented in the hydraulic systems of FIGS. 4A-B, according to some embodiments.

Referring now to FIG. 5, a detailed diagram of hydraulic manifold 406. Manifold 406 is shown to include ports 702, 704, hoses 706, frame 708, and implement 710. Manifold 406 may include any number of implements, and each implement may have several identifiers corresponding to each of the ports located on the implement. For example, implement 710 is shown to have 6 valves. Each valve may correspond to a unique identifier (e.g., valve 1 corresponds to ID 1, valve 2 corresponds to ID 2, etc.). Each implement configuration may be saved to memory of controller 602, such that all of the unique ID's of each of the hoses are also saved. This may allow the user to plug hoses into any port of implement 710 and controller 602 can configure manifold 406 to provide proper functionality.

In some embodiments, a user can enter preferred operating credentials for manifold 406. For example, a user enters how the correct configuration on how the system should be assembled. Once the system is assembled, electronic identifiers communicate the assembly to controller 602, where the assembly is different than the correct configuration. Controller 602 can then adjust the internal operation of manifold 406 to match the preferences entered by the user. This can allow the system to be connected in any fashion, and the valve configuration can be adjusted to match the preferences provided.

In some embodiments, a user can enter preferred operating credentials for each particular hose. Memory 608 may then store the preferences for each hose, where the electronic identifiers for each hose provide a unique identification that corresponds to the operating conditions for each hose. When the hose data is received, controller 602 can adjust the operation of system 400 (e.g., adjust internal operation of manifold 406) to match the preferred preferences of one or more of the hoses.

Figure 6B:
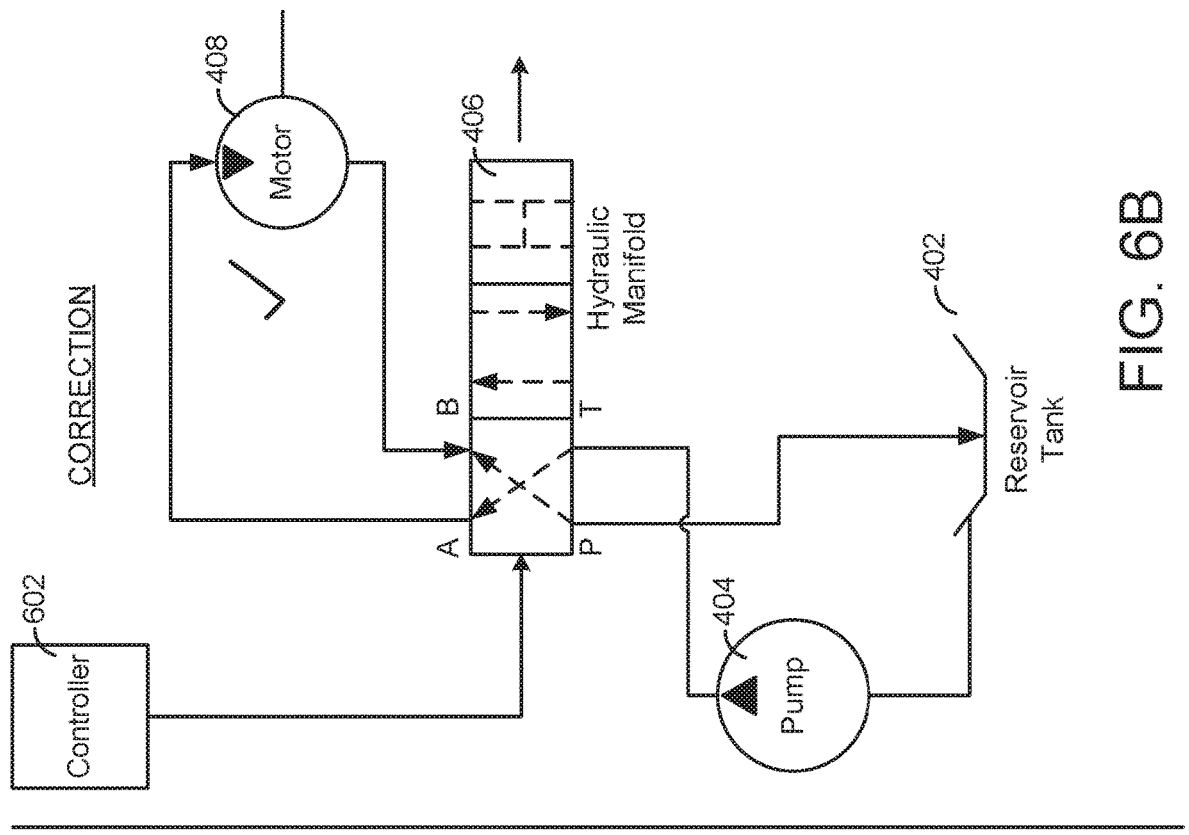
FIG. 6B is a diagram of a corrected hydraulic system that can be implemented in the vehicle of FIG. 1, according to some embodiments.
Figure 6A:
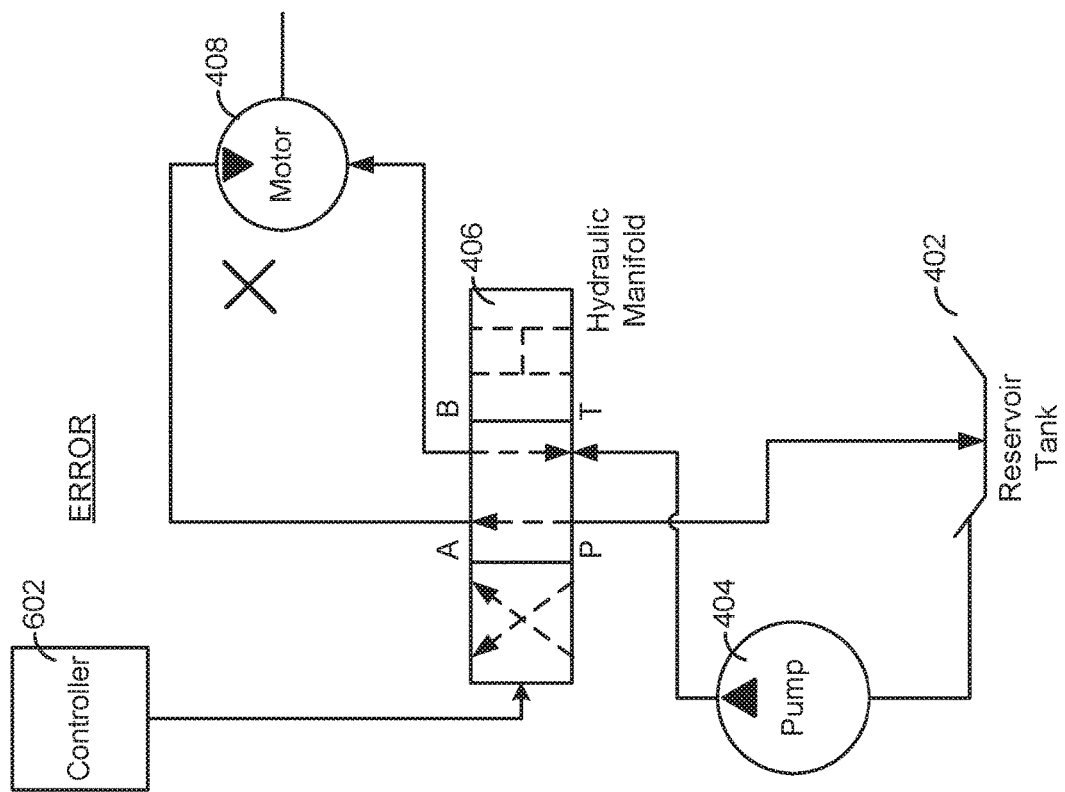
FIG. 6A is a diagram of a faulty hydraulic system that can be implemented in the vehicle of FIG. 1, according to some embodiments.

In some embodiments, the manifold 406 can have a bank of general ports, some or all of which may not be specifically dedicated to particular implements. For example, hose 502 is not necessarily dedicated to attached to port P. Controller 602 may receive the signals identifying the connects and control valves in the manifold to route hydraulic fluid and perform the indicated control operations based on the connections, such that the user can connect the multiple hoses to any port that is convenient. This may require adjusting the interior operation of valve 406 (e.g., moving the valve positioning as shown in FIGS. 6A-B).

Referring now to FIGS. 8A-B, diagrams for showing fault correction of hydraulic system 400 are shown, according to some embodiments. FIG. 6A shows system 400 with an incorrect hose configuration, while FIG. 6B shows the system 400 after correction. In FIG. 6A, pump 404 has been connected to port T, which—as manifold 406 is currently configured, is supposed to route fluid from the outlet of motor 408 to reservoir tank 402. Additionally, port P has been connected back to reservoir tank 402. As such, the fluid cannot flow from pump 404, through motor 408, and back to reservoir tank 402.

Controller 602 may detect this issue using similar methods described above with reference to FIGS. 6A-B. Once detected, controller 602 may correct the fault by changing the port configuration of hydraulic manifold 406. This is shown in FIG. 6B, wherein hydraulic manifold is not in the "reverse" position, which fluidly connects port T with port A, and port P with port B, thus allowing fluid to flow throughout the system. This single example is merely meant to be exemplary and should not be considered limiting in any way. Several other port configurations, positions, and adjustments to the system may be implemented to correct for assembly faults.

Control System Process

Figure 7:
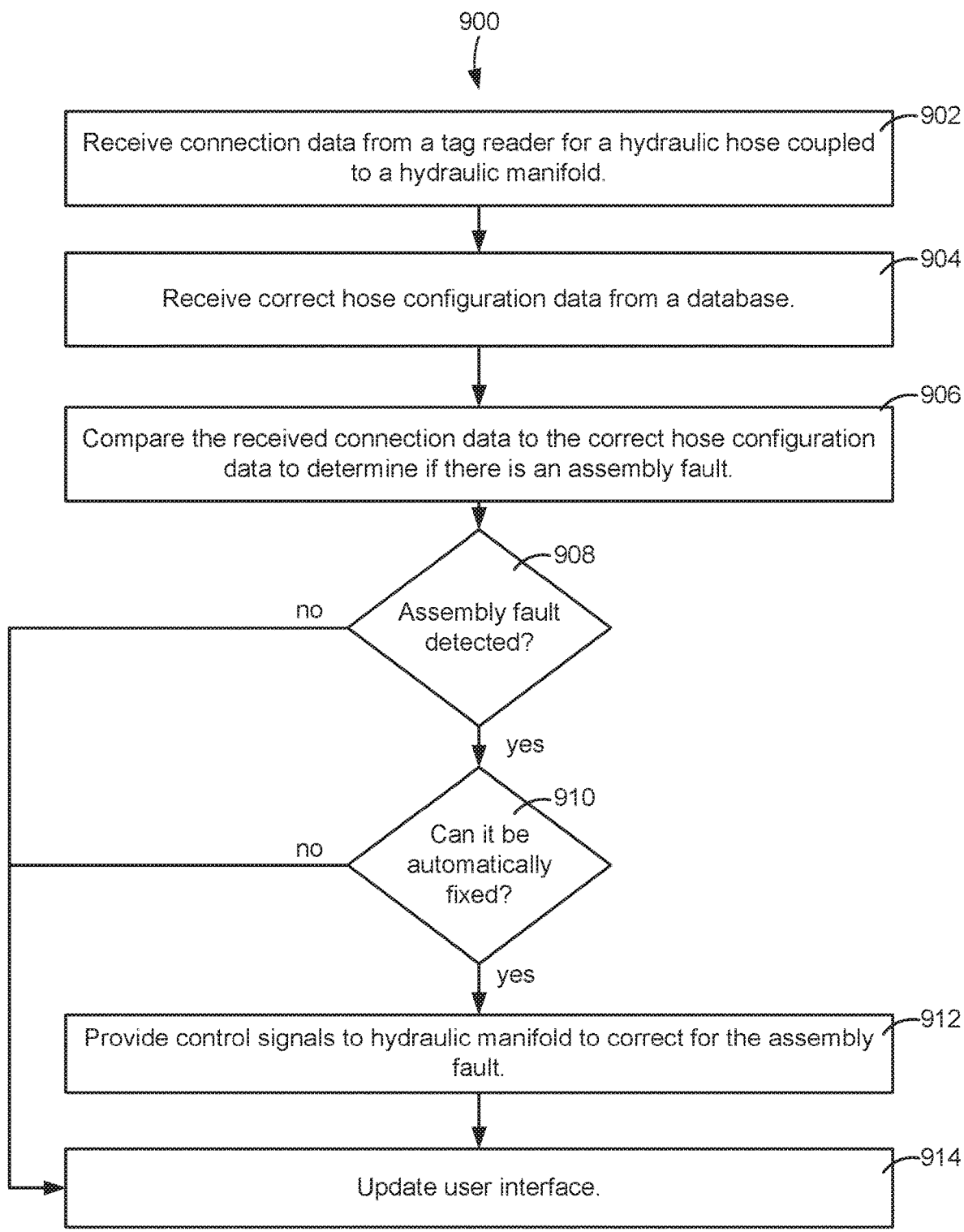
FIG. 7 is a flow diagram of a process for monitoring hydraulic hose connections which can be performed by the controller of FIG. 4A, according to some embodiments.

Referring now to FIG. 7, a process 900 for monitoring and adjusting for fault connections in a hydraulic system of a vehicle is shown, according to exemplary embodiments. Process 900 may be performed by any one of the processing components described herein, such as controller 602. Process 900 may be performed automatically, based on instruction from a user, or based on received data.

Process 900 is shown to include receiving connection data from a tag reader for a hydraulic hose coupled to a hydraulic manifold (step 902). In some embodiments, connection data can be received from the electronic identifiers (e.g., passive tag 504, tag reader 508, etc.) that are used to transmit and receive data regarding hose 502 and the characteristics thereof. Connection data may also include determining what port hose 502 has connected to. This may be done my using an identifier relating hose 502 (e.g., ID-4, etc.) that, when a signal with the identifier is received, the signal can be analyzed to determine that the identifier represents hose 502. For example, when tag reader 508 transmits an RFID signal to passive tag 504, the identifier is provided back to tag reader 508 and determines that hose 502 is the hose coupled to connector 506.

Process 900 is shown to include receiving correct hose configuration data from a database (step 904). In some embodiments, fault manager 612 receives other sets of data that indicate proper assembly and/or operation of hydraulic system 400. For fault manager 612 to determine if hose 502 has been coupled to the correct port, fault manager 612 may have a priori data on all correct hose/port configurations. This may be stored locally within memory 608, or received (e.g., wired or wirelessly) via an external source (e.g., cloud, Wi-Fi, etc.).

Figure 9:
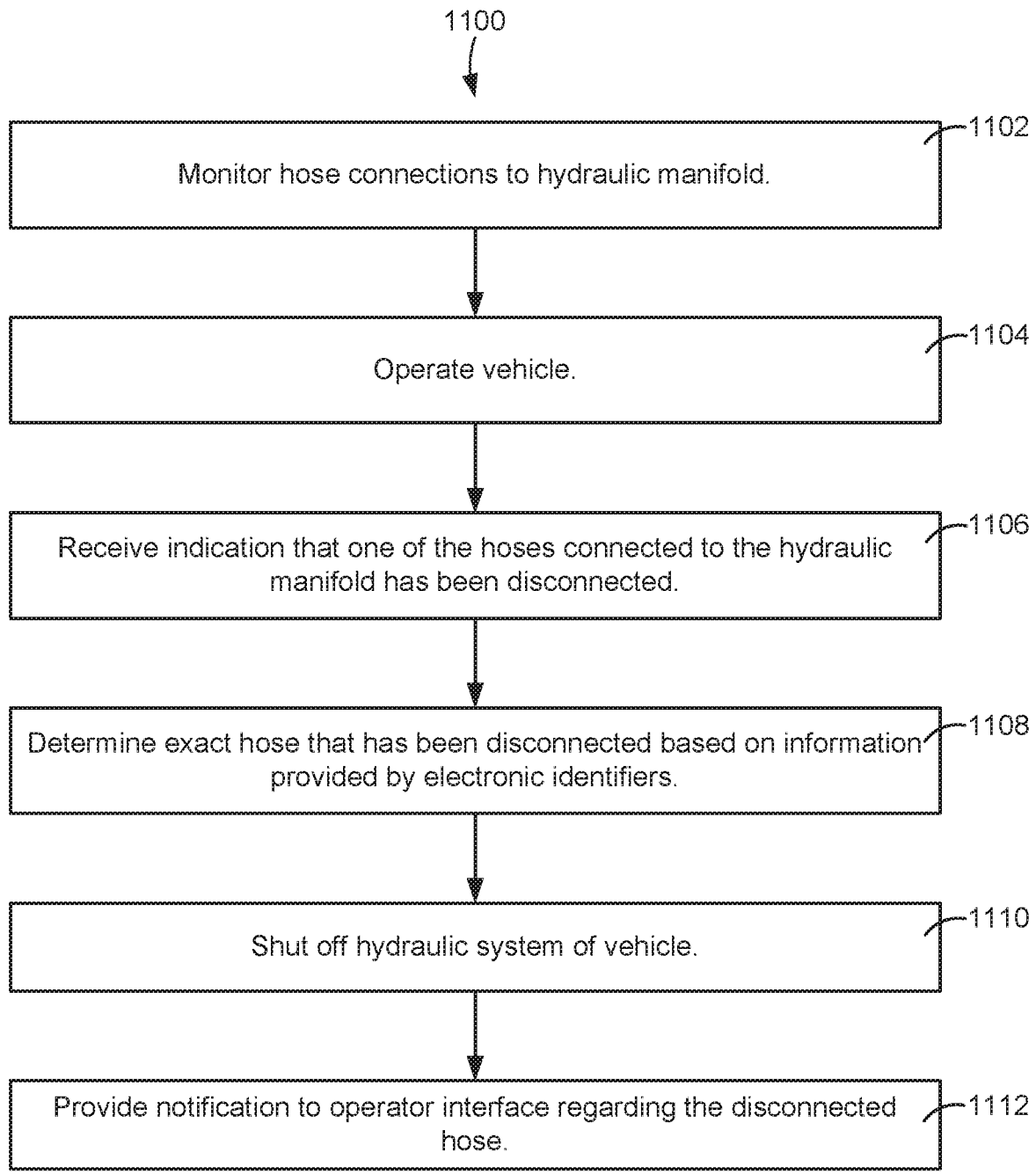
FIG. 9 is a flow diagram of a process for detecting disconnected hoses which can be performed by the controller of FIG. 4A, according to some embodiments.

Process 900 is shown to include comparing the received connection data to the correct hose configuration data to determine if there is an assembly fault (step 906). Comparing the received connection data to the correct hose configuration may simply include determining whether the ID tag of the received connection data matches the correct ID tag stored in the database. If an assembly fault is detected (step 908), alert manager 614 may then determine whether the fault can be automatically adjusted (step 910). If a fault has been detect and the assembly can be automatically adjusted to correct for the fault, alert manager 614 may then provide instructions for hydraulic manifold adjustment manager to adjust the valve positions in such a way that system 400 may operate correctly without reassembling the hoses (step 912). If a fault is detected and it cannot be automatically adjusted, a notification may be provided to operator interface 632 (step 914) indicating that the fault needs to be corrected (an example of this is shown in FIG. 9). If no fault has been detected, a notification may be sent to operator interface 632 (step 914) indicating that assembly/operation is correct.

Figure 8:
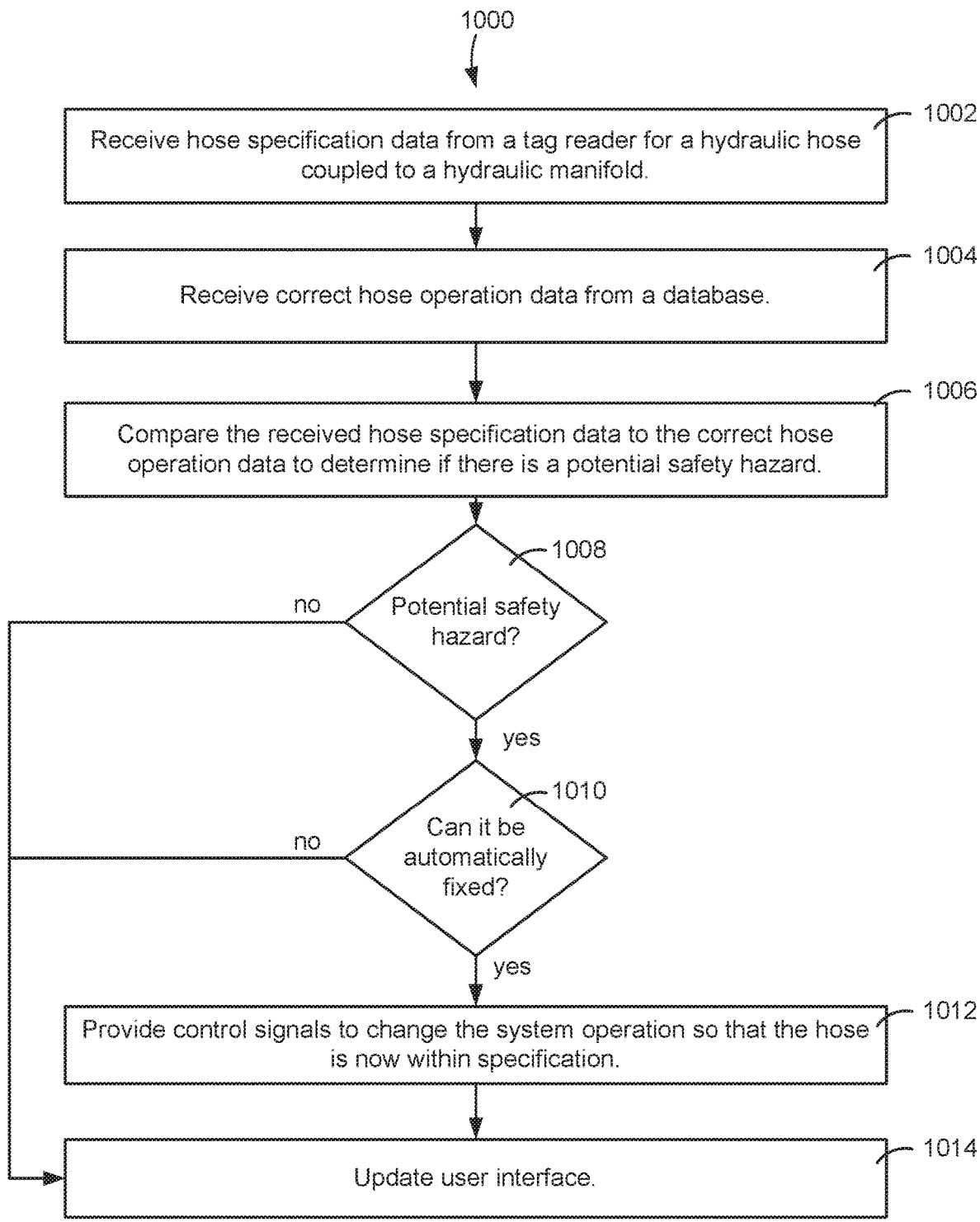
FIG. 8 is a flow diagram of a process for detecting hose operation hazards which can be performed by the controller of FIG. 4A, according to some embodiments.

Referring now to FIG. 8, a process 1000 for monitoring and adjusting for safety hazards in a hydraulic system of a vehicle is shown, according to exemplary embodiments. Process 1000 may be performed by any one of the processing components described herein, such as controller 602. Process 1000 may be performed automatically, based on instruction from a user, or based on received data.

Process 1000 is shown to include receiving hose specification data from a tag reader for a hydraulic hose coupled to a hydraulic manifold (step 1002). In some embodiments, tag reader 508 provides specification data relating to hose 502 to controller 602. As discussed above, this data can relate to the actual operative properties of the hose. In some embodiments, the data can also include operative properties relating to the component in which the hose is connecting to from the other hose end (e.g., pump 404).

In some embodiments, these operative properties of the hose include diameter, length, pressure ratings, and/or intended applications. This data may be provided to controller 602 such that controller 602 can determine if these operative properties will be sufficient for implantation of hose 502 in system 400. For example, if the maximum pressure rating for hose 502 was below the intended pressure levels of the system, and controller 602 was aware of the intended pressure levels of the system, controller 602 may be able to determine that hose 502 may cause a safety issue if implemented within system 400.

Process 1000 is shown to include receiving correct hose operation data from a database (step 1004). Controller 602 may receive the correct hose operation data from a database stored within memory 608, or from an external device. For example, an operator or user using operator interface 632 may input the information directly into controller 602 via operator interface 632.

Process 1000 is shown to include the comparing the hose specification data to the correct hose operation data to determine if there is a potential safety hazard (step 1006). Comparing the received hose specification data to the correct hose operation data may include comparing to find an exact match in the data or comparing to find if the received hose specification data is within a certain threshold that would be considered acceptable for operation. For example, if—based on the stored operation data—if the system typically operates within a pressure range of 2400-4000 psi, and hose 502 is rated for 2500-3900 psi, this may be considered an acceptable hose implantation. In another example, controller 602 may indicate a safety hazard for any hose that does not exactly match the intended hose diameter of ⅜ in.

Process 1000 is shown to include a determination step to determine whether there is a potential safety hazard that has occurred from the connection of hose 502 (step 1008). Fault manager 612 may determine that there is a fault using the analytics described above and proceed to send a fault signal to alert manager 614. Process 1000 is shown to include another determination step to determine whether the fault can be automatically fixed (step 1010). In some embodiments, these operation faults may be automatically adjusted by lowering the flow rate of the pump or adjusting the motor speed to change the system operation so that hose 502 is now within specification (step 1012). In other embodiments, the operation fault is not fixed automatically and a notification is provided to operator interface 632 to notify a user of the fault (step 1014).

Referring now to FIG. 9, a process 1100 for monitoring hose connections and detecting a disconnected hose during operation, according to exemplary embodiments. Process 1100 may be performed by any one of the processing components described herein, such as controller 602. Process 1100 may be performed automatically, based on instruction from a user, or based on received data.

Process 1102 is shown to include monitoring hose connections to hydraulic manifold (step 1102). In some embodiments, tag reader 508 or other means for monitoring the hose connections (as described above) may continually monitor the connection before, during, or after operation of work vehicle 10 (e.g., as mentioned in step 1104). For example, tag reader 508 continuously sends a signal to passive tag 504 to make sure that hose 502 is still connected to connector 506 when work vehicle 10 is turned on or when hydraulic system 400 is implemented.

Process 1100 is shown to include receiving indication that one of the hoses connected to the hydraulic manifold has been disconnected (step 1106). Process 1100 is also shown to include determining exact hose that has been disconnected based on information provided by electronic identifiers (step 1108).

In some embodiments, while work vehicle 10 is moving for example, one of the hoses connected to manifold 406 becomes disconnected. Tag reader 508 may continuously monitor for a return signal from passive tag 504, and therefore fails to receive one upon disconnection. Port P circuit 620 may include processing that allows port p circuit 620 to transmit a signal to controller 602 indicating that no return signal was received by passive tag 504. Either port P circuit 620 or controller 602 may determine that this is indicative of a disconnected hose. In other embodiments, this may be indicative of a failed passive tag.

Process 1110 is shown to include shutting off the hydraulic system of the vehicle (step 1110). Once the "hose disconnected" fault has been detected, controller 602 may shut off work vehicle 10 or at least hydraulic system 400 for safety purposes, as there may be a chance that a hose being disconnected can result in potential damage or danger to the operator, system 400, work vehicle 10, or any combination thereof. In some embodiments, the operator may do this without the controller once he/she becomes aware of the fault. Process 1100 is shown to include provide notification to operator interface regarding the disconnected hose (step 1112). In some embodiments, notifications regarding the detection of the fault, how to fix the fault, an indication that the system(s) have been shut down for safety purposes, or other updates can be relayed to the user via operator interface 632.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of various systems (e.g., system 100, system 200, etc.) and methods as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A hose assembly for a hydraulic system, the hose assembly comprising:
   a first hose configured to fluidly couple a pump with a hydraulic actuator using a first port, wherein the first hose comprises a first electronic device configured to provide identification information for the first hose;
   a second hose configured to fluidly couple the hydraulic actuator with a hydraulic return component using a second port, wherein the second hose comprises a second electronic device configured to provide identification information for the second hose; and
   a controller configured to:
     receive a first connection signal using the identification information for the first hose and a second connection signal using the identification information for the second hose;
     determine that the first hose has fluidly coupled using the first port based on the first connection signal;
     determine that the second hose has fluidly coupled using the second port based on the second connection signal;
     determine a connection fault based on at least one of the first connection signal and the second connection signal;
     adjust internal operation of a hydraulic manifold to fluidly couple the pump with the hydraulic actuator using the first hose and to fluidly couple the hydraulic actuator with the hydraulic return component using the second hose.

2. The hose assembly of claim 1, wherein:
   the hydraulic manifold comprises the first port and the second port; or
   the hydraulic actuator comprises the first port and the second port.

3. The hose assembly of claim 1, wherein the first port is configured to allow fluid to flow from the pump to the hydraulic actuator, and wherein the second port is configured to allow the fluid to flow from the hydraulic actuator to the hydraulic return component.

4. The hose assembly of claim 3, further comprising:
   a first transmitter proximate to the first port, the first transmitter configured to:
     communicate with the first electronic device to receive the identification information for the first hose; and
     provide the first connection signal based on the identification information for the first hose, wherein the first connection signal comprises an indication that the first hose is connected to the first port; and
   a second transmitter proximate to the second port, the second transmitter configured to:
     communicate with the second electronic device to determine the identification information for the second hose; and
     provide the second connection signal based on the identification information for the second hose, wherein the second connection signal comprises an indication that the second hose is connected to the second port.

5. The hose assembly of claim 4, wherein the first transmitter and the first electronic device communicate via passive tag radio-frequency identification (RFID), active tag RFID, near-field communication (NFC), near-field magnetic induction (NFMI), Bluetooth, or Wi-Fi.

6. The hose assembly of claim 5, wherein the first electronic device is a passive RFID tag and the first transmitter comprises an active RFID reader configured to read the passive RFID tag to determine the identification information for the first hose.

7. The hose assembly of claim 1, wherein the controller is further configured to provide a notification of the connection fault to a monitoring device of the hydraulic system.

8. A method of determining faults in a hydraulic system, the method comprising:
receiving a first connection signal using the identification information for the first hose and a second connection signal using the identification information for the second hose;
determining that the first hose has fluidly coupled using the first port based on the first connection signal;
determining that the second hose has fluidly coupled using the second port based on the second connection signal;
determining a connection fault based on at least one of the first connection signal and the second connection signal;
adjusting internal operation of the hydraulic manifold to fluidly couple the pump with the hydraulic actuator using the first hose and to fluidly couple the hydraulic actuator with the hydraulic return component using the second hose.

9. The method of claim 8, wherein the identification information for the first hose comprises a type, a manufacture, a functionality, or a configuration of the first hose.

10. The method of claim 8, wherein the connection signal for the first hose comprises connection information that identifies a port that the first hose uses to fluidly couple the pump.

11. The method of claim 8, wherein receiving identification information and connection signal for the first hose comprises receiving identification information and connection signal via passive tag radio-frequency identification (RFID), active tag RFID, near-field communication (NFC), near-field magnetic induction (NFMI), Bluetooth, or Wi-Fi.

12. The method of claim 11, wherein receiving identification information and connection signal for the first hose comprises receiving receive identification information and connection signal via a passive RFID tag coupled to the first hose and an active RFID reader proximate to the first port, the active RFID reader configured to read the passive RFID tag to determine the identification information for the first hose.

13. The method of claim 8, wherein:
determining a connection fault based on at least one of the identification information and connection signal comprises determining that the first hose has disconnected from the first port; and
providing a notification of the connection fault comprises providing an indication of the first hose being disconnected from the first port to the monitoring device.

14. A hydraulic system comprising:
a first hose configured to fluidly couple a pump with a hydraulic actuator using a first port, wherein the first hose comprises a first electronic device configured to provide identification information for the first hose;
a second hose configured to fluidly couple the hydraulic actuator with a hydraulic return component using a second port, wherein the second hose comprises a second electronic device configured to provide identification information for the second hose; and
a controller configured to:
receive a first connection signal using the identification information for the first hose and a second connection signal using the identification information for the second hose;
determine that the first hose has fluidly coupled using the first port based on the first connection signal;
determine that the second hose has fluidly coupled using the second port based on the second connection signal;
determine a connection fault based on at least one of the first connection signal and the second connection signal;
adjust internal operation of a hydraulic manifold to fluidly couple the pump with the hydraulic actuator using the first hose and to fluidly couple the hydraulic actuator with the hydraulic return component using the second hose.

15. The hydraulic system of claim 14, wherein:
the hydraulic manifold comprises the first port and the second port; or
the hydraulic actuator comprises the first port and the second port.

16. The hydraulic system of claim 14, wherein the first port is configured to allow fluid to flow from the pump to the hydraulic actuator, and wherein the second port is configured to allow the fluid to flow from the hydraulic actuator to the hydraulic return component.

17. The hydraulic system of claim 16, further comprising:
a first transmitter proximate to the first port, the first transmitter configured to:
communicate with the first electronic device to receive the identification information for the first hose; and
provide the first connection signal based on the identification information for the first hose, wherein the first connection signal comprises an indication that the first hose is connected to the first port; and
a second transmitter proximate to the second port, the second transmitter configured to:
communicate with the second electronic device to determine the identification information for the second hose; and
provide the second connection signal based on the identification information for the second hose, wherein the second connection signal comprises an indication that the second hose is connected to the second port.

18. The hydraulic system of claim 17, wherein the first transmitter and the first electronic device communicate via passive tag radio-frequency identification (RFID), active tag RFID, near-field communication (NFC), near-field magnetic induction (NFMI), Bluetooth, or Wi-Fi.

19. The hydraulic system of claim 18, wherein the first electronic device is a passive RFID tag and the first transmitter comprises an active RFID reader configured to read the passive RFID tag to determine the identification information for the first hose.

20. The hydraulic system of claim 14, wherein the controller is further configured to provide a notification of the connection fault to a monitoring device of the hydraulic system.

* * * * *